Aug. 17, 1943.   P. M. SCHUFTAN   2,327,133
SEPARATION OF SUPERHEATED VAPORS
Filed March 28, 1940   4 Sheets-Sheet 4
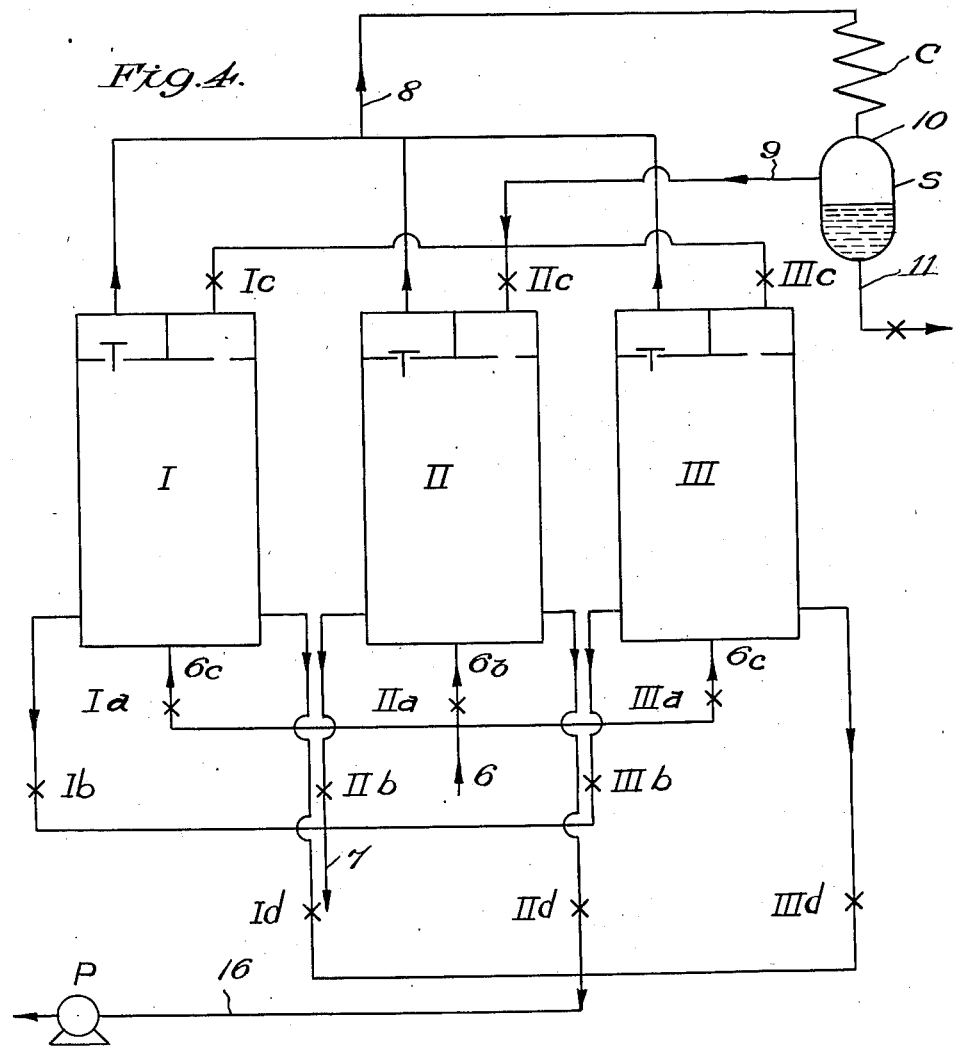
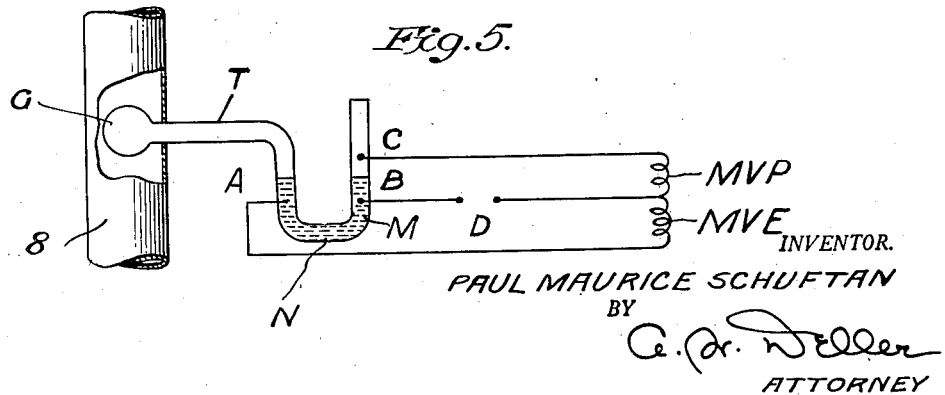
INVENTOR.
PAUL MAURICE SCHUFTAN
BY
ATTORNEY Patented Aug. 17, 1943

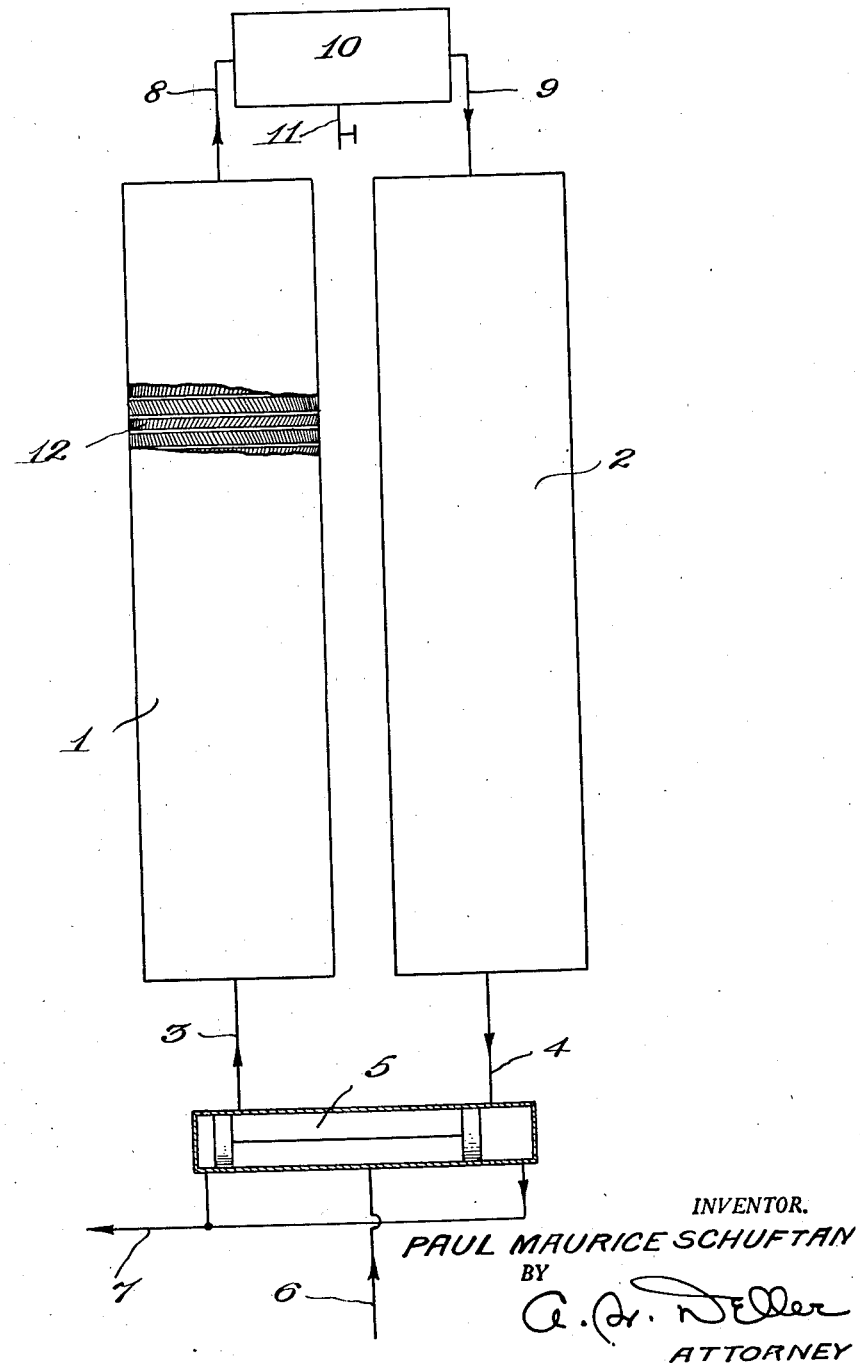

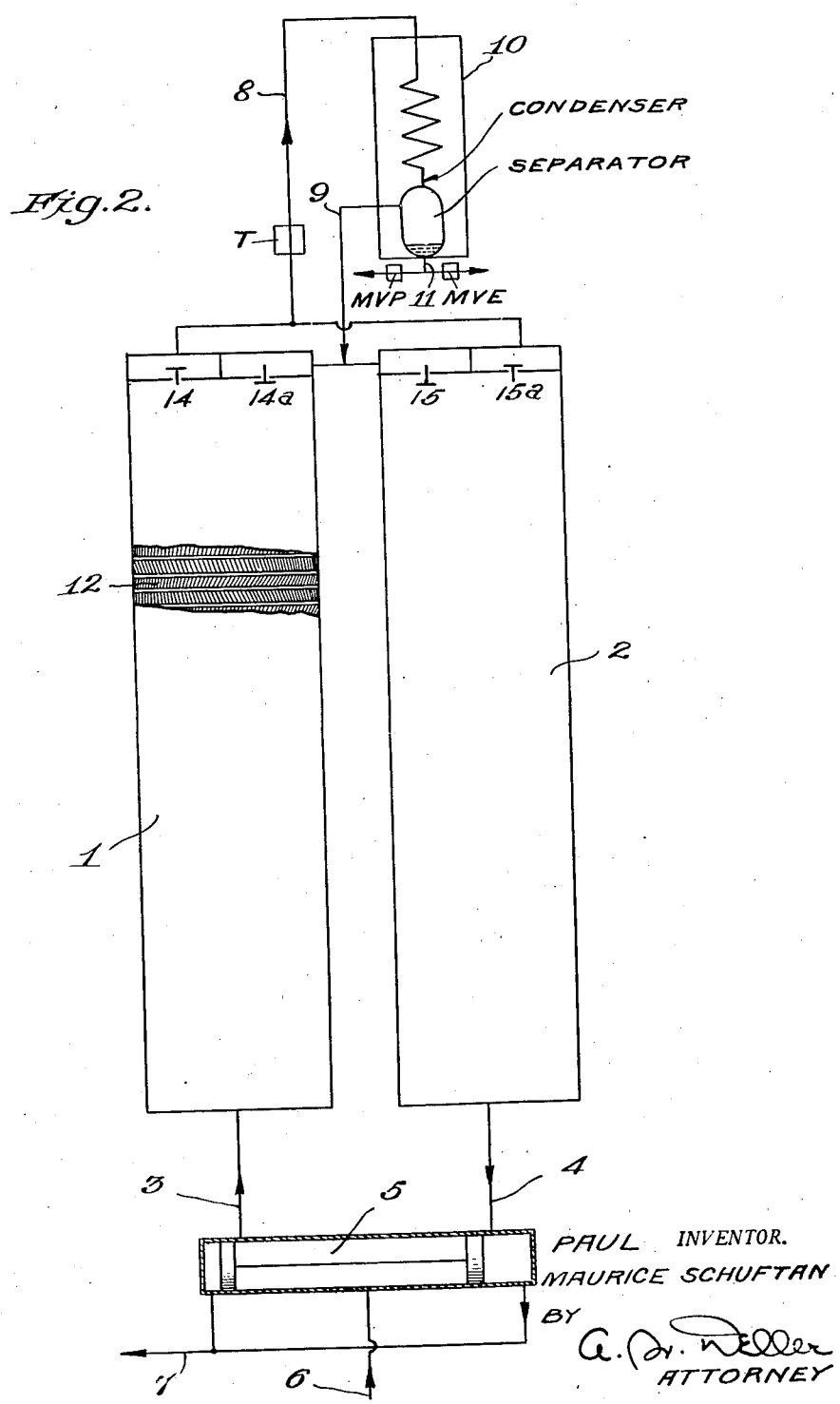

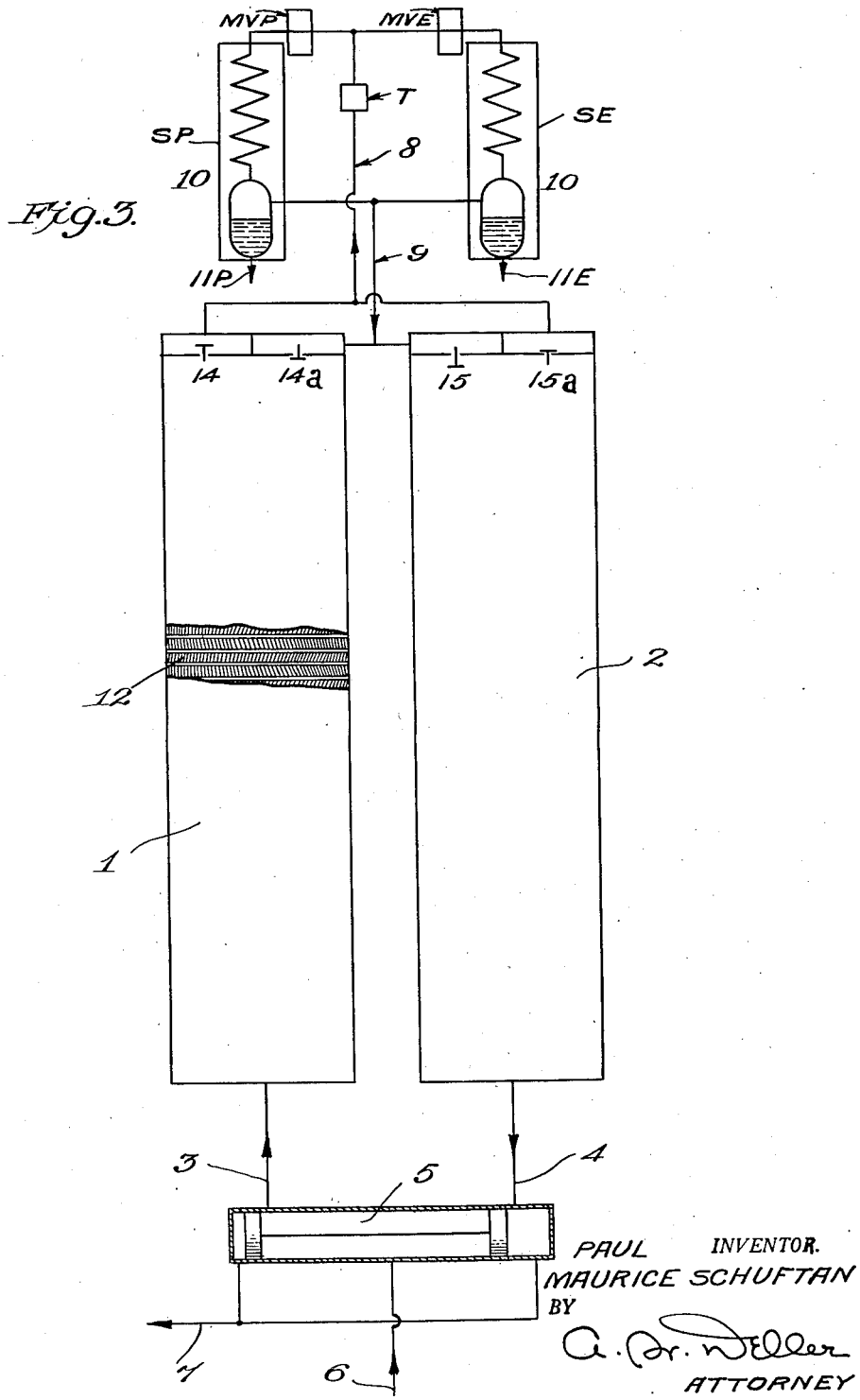

2,327,133

UNITED STATES PATENT OFFICE 2,327,133

SEPARATION OF SUPERHEATED VAPORS

Paul Maurice Schuftan, Richmond Hill, England assignor to The British Oxygen Company Limited, London, England Application March 28, 1940, Serial No. 326,465
In Great Britain March 24, 1939

5 Claims. (Cl. 62—175.5)

The present invention relates to the separation of superheated vapors comprising mutually soluble constituents or of groups of mutually soluble constituents of different boiling points by passing the mixture through a previously cooled regenerator.

According to the present invention a process for separating by rectification superheated vapors of mutually soluble constituents or groups of superheated mutually soluble constituents having different boiling points comprises passing the constituents into a precooled regenerator, the temperature of which is such that, during the initial stages of the passage of the constituents into the regenerator, practically the whole of the higher boiling point constituents together with a substantial proportion of the lower boiling point constituents are condensed on the surface of the storage mass, and continuing the feeding of the mixed constituents into the regenerator until, in consequence of the progressive rise in temperature of the storage mass and the attendant rectification effect, the lower boiling point constituents are substantially revaporised and removed from the regenerator, and thereafter removing the higher boiling point constituents selectively retained on the storage mass.

During the passage of the constituents a progressive rise in temperature of the storage mass takes place and the superheated mixture of constituents revaporises some condensates already present in the regenerator, thereby enriching and saturating itself with the constituents of higher boiling point. When reaching a still colder zone of the storage mass, in which zone the condensates contain a higher proportion of lower boiling point constituents, further condensation of higher boiling point constituents from the gas mixture is accompanied by a corresponding vaporisation of constituents of lower boiling point. Thus, during the warming-up period the constituents of lower boiling point are progressively revaporised from the liquid film present on the surface of the storage mass, and replaced by condensing constituents of higher boiling point. The extent to which the lower boiling point constituents can be revaporised is determined by the equilibrium conditions between vapor and liquid prevailing at the temperature and pressure at the end of the warming-up period.

At the end of the warming-up period, the condensate containing the constituents of higher boiling point in concentrated form have to be removed from the regenerator, which is again cooled before admitting a further volume of constituents to be separated.

According to another feature of this invention, the removal of the higher boiling point constituents from the regenerator may be effected by revaporisation at a lower partial pressure than that at which they have been condensed, whereby these constituents may be recovered in a concentrated form. This revaporisation results in a partial cooling of the storage mass, the balance of the necessary amount of cold being imparted to the storage mass by passing a cold gas through the regenerator. Alternatively, when recovery of the higher boiling point constituents in a highly concentrated form is not necessary, they may be revaporised directly into the gas used for re-cooling the regenerators.

The constituents of higher boiling point obtained in the regenerator may also be removed therefrom by continuing the passage of the mixed constituents until the constituents of higher boiling point are substantially revaporised. Since the two fractions, namely the lower boiling constituents and the higher boiling constituents, leave the regenerators during successive periods, they may easily be kept apart and worked up independently in order to effect any desired further separation of constituents.

The process may be also used in cases where the constituents of higher and lower boiling point to be separated are not available in concentrated form, but are diluted with other constituents of lower boiling point from which it is desired that they should be separated. In such cases the mass transfer, i. e. the deposition of condensates on the storage mass and the revaporisation occurring during the rectification which takes place in the regenerator, is accompanied by substantial heat transfer serving to effect pre-cooling and pre-purification of those constituents which, by virtue of their low boiling point, do not take part in the mass transfer.

This, for instance, would apply in the case of the selective recovery of ethylene as the constituent of lower boiling point from a gas mixture containing also constituents of higher boiling points such as propylene, ethane and carbon dioxide, in admixture with hydrogen, methane etc., as for instance, in the case of coke-oven gas or oil refinery gas. In this case, the regenerators are, according to the invention, pre-cooled to such a low temperature as to allow of complete condensation of the propylene, together with a substantial proportion of the ethane and ethylene, whilst practically no condensation or mass transfer of the lower boiling point constituents, i. e. hydrogen, carbon monoxide and methane takes place, these constituents entering only into heat transfer. The warming-up period is interrupted when the temperature at the cold end has risen to a level at which the ethylene has been substantially revaporised from the condensate in the regenerator and before any appreciable amount of propylene appears in the gas leaving the regenerator.

It is thus possible selectively to retain the propylene and a considerable proportion of the ethane in the regenerators and recover nearly all the ethylene, since, on account of the equilibrium conditions and owing to the small amount of propylene present in the raw gas, only a very small amount of ethylene will be retained in the regenerator. At the same time the bulk of the gas is precooled to an extent such that substantially all impurities such as water vapor and carbon dioxide are retained in the regenerator. From the cooled gas leaving the regenerator, the ethylene may then be recovered in a high degree of purity by subsequent cooling and rectification, after which the gas, freed from ethylene, is passed back into the regenerators and used for the recooling thereof and revaporisation of the condensates, such as propylene, ethane, water vapor and carbon dioxide. If recovery of the propylene etc. is desired in concentrated form, this may be effected by revaporising it at a suitable reduced pressure before passing the cooling gas into the regenerator.

The temperature to which the regenerator is cooled must be such that throughout the operation it will be within such limits that the amount of condensates formed in the liquid state and retained on the storage mass is sufficient to remove to the desired extent the constituents of higher boiling point from the mass of gas passed through the regenerator during the warming-up period.

It will be understood that in view of the mass transfer which occurs, the storage mass in the regenerator should have a sufficiently large heat capacity to keep the regenerator within the requisite temperature limits during the time which is available between successive periods of alternation.

It will be appreciated that the storage mass constitutes, in view of its very large surface, a series of highly efficient rectification trays, in which the pressure loss is very low.

In order to increase the efficiency of this rectification and to avoid any residue of non-vaporised constituents reaching colder zones of the regenerator, mixed constituents to be separated are preferably made to flow in an upward direction through the regenerator.

The invention will now be described with reference to Fig. 1 of the accompanying drawings, which shows a flow sheet diagrammatically representing an apparatus for carrying out the present process. Two regenerators 1 and 2 are connected at their lower ends through conduits 3 and 4, respectively, to a conventional form of reversing mechanism 5 having a gas inlet pipe 6 and a discharge pipe 7. At their upper ends, regenerators 1 and 2 are respectively connected through conduits 8 and 9 to a separating device 10. The separating device has a valved draining pipe 11 for removing any desired product of higher boiling point and may be of any appropriate form, such as, for example, a rectification column with conventional condenser and vaporiser, as those skilled in the art will know. The storage mass in the regenerators for storing up and transferring heat is indicated by reference numeral 12.

As represented in the drawings, it is assumed that regenerator 1 has been precooled to the requisite temperature and that the raw gas mixture is being fed into this regenerator at the bottom thereof through conduit 3. It is further assumed that regenerator 2 is being cooled down by the cold gases passing into it at its upper end from condenser 10. Thus, the direction of fluid flow is as represented by the direction of the arrows in the drawings.

Where the regenerators are being used for the separation of ethylene from coke oven gas, as set forth above, the gas enters into regenerator 1 at a certain pressure and temperature, such as, for example, a superatmospheric pressure of about 1.3 atmospheres gauge and the temperature of about 20° C. At the upper end of a regenerator, the gases emerge during the initial stages of operation in that direction at a very much lower temperature, say of the order of about $-143°$ C., and ethylene condenses in regenerator 1 together with constituents of higher boiling point, such as propylene. As the regenerator warms up due to the transfer of heat from the gases thereto, the temperature of the emerging gases rises a small amount, say to about $-133°$ C., and the condensed ethylene revaporises and passes out of the regenerator with other uncondensed constituents of still lower boiling point, such as methane and hydrogen. The ethylene is recovered in the separation device 10 and is removed therefrom through pipe 11. The cold gases, now free of recondensed ethylene, pass on to regenerator 2, where they descend, taking up the heat stored in the regenerator. When regenerator 1 has been warmed by the incoming gas mixture to such an extent that the gases leaving its upper end reach a predetermined temperature, say about $-133°$ C., the direction of flow in the apparatus is reversed by operating the reversing mechanism 5, and the direction of flow through the apparatus is opposite to that indicated by the direction of the arrows in the drawings.

As those skilled in the art know, one or more separating units may be employed in conjunction with regenerators and by means of various arrangements of the valves the separation of the gas mixture into components readily accomplished. The arrangement of the separator and the valves does not form a part of the present invention. However, for illustrative purposes various arrangements will be described (in conjunction with Figures 2, 3, 4 and 5) which have been used to recover separately a crude condensate enriched in ethylene and a second crude condensate enriched in proylene or a more concentrated propylene fraction. When it is desired to recover separately a crude condensate enriched in ethylene and a second crude condensate enriched in propylene, one or the other of the following methods may be adopted:

Method A

After the ethylene condensate has been revaporized from the storage mass as indicated by the temperature at the cold end of the regenerator the passage of the warm gas through the regenerator is continued so as to vaporize the propylene condensate by using automatic change-over valve mechanism 11. The change-over valve mechanism can, for example, be operated by a thermo-sensitive control provided at the cold end of the regenerator and the propylene can be recovered separately from the ethylene. The automatic change-over valve mechanism may be arranged preferably in one or two other of the following two places:

(a) the automatic change-over valve mechanism can be arranged in pipe 11 of separator 10 and the condensed ethylene and propylene diverted thereby into separate systems as indicated in Figure 2, or, (b) two separators may be provided as in Figure 3, and the change-over valve inserted in pipe line 8 whereby the gas rich in ethylene is diverted into one separator and that enriched in propylene into the other separator.

*Method B*

After the ethylene condensate has been revaporized from the storage mass as indicated by the temperature at the cold end of the regenerator, the further passage of the raw mixed gases is stopped and the delivery conduit of the regenerator leading to the separator 10 is closed by a valve of any suitable type. A vacuum pump is then connected to the warm end of the regenerator and the propylene condensate thus revaporized and obtained in concentrated form and at atmospheric temperature.

These methods will now be described in further detail with reference to the drawings, Figs. 2 to 5, in which Fig. 2 shows diagrammatically an arrangement for carrying out Method Aa, Fig. 3 shows diagrammatically an arrangement for carrying out Method Ab, Fig. 4 shows diagrammatically an arrangement for carrying out Method B, and Fig. 5 shows diagrammatically a thermometric control for an automatic valve mechanism such as is shown in Figs. 2, 3 and 4.

(Like parts are referred to by the same reference characters on all figures.)

Referring particularly to Fig. 2, two generators 1 and 2 having storage mass 12, are connected at the warm end through conduits 3 and 4 respectively to automatic switching mechanism 5, e. g., a piston valve, having inlet pipe 6 and discharge pipe 7 as described in Fig. 1. From cold end of the regenerators conduit 8 leads to a single separating device 10 consisting of a condenser and a separator. From the upper part of the separator uncondensed gases return through conduit 9 to cool the regenerator. The course of the gases through the regenerators 1 and 2 being controlled by pressure operated valves 14, 14a; 15 and 15a. Liquid collecting in the separator is drained therefrom through branch pipe 11, one branch of which is fed through an automatic valve MVE and the other branch through a like valve MVP. These valves may be conveniently operated magnetically under control of a thermo-sensitive device T in conduit 8. A suitable thermo-sensitive device is more fully illustrated in Fig. 5 where T represents a vapor pressure thermometer; the gas bulb G of which is inserted in conduit 8. The U-tube N containing mercury M is provided with three terminals A, B and C. Terminal A is connected through the solenoid of magnetic valve MVE and a source of electric current D to terminal B whilst terminal C is connected through the solenoid of magnetic valve MVP and the source of current D to B. The thermo-regulator operates in the following manner:

When initially the temperature at the exit end of the regenerator is such that only ethylene is being vaporized from the storage mass 12 whilst propylene and other higher boiling point constituents are retained therein the mercury bridges the terminals A and B as shown in Fig. 5 and the solenoid of valve MVE is energized so as to open the valve and permit the ethylene-enriched gases to pass to a container therefor. As a result of the progressive rise of the temperature of the storage mass, the gas in bulb G expands forcing the column of mercury M higher in the longer vertical tube of the U-tube N thereby breaking the contact between terminals A and B and simultaneously completing the electrical circuit through terminals B and C. At this point propylene begins to revaporize from the storage mass and the magnetic valve MVE closes due to the break in the electrical circuit A, D, B, M, whilst the magnetic valve MVP opens due to the completion of the electrical circuit B, D, C, M and permits the propylene-enriched condensate then collecting in the separator to pass into a container for the propylene-enriched fraction. When, as a result of switching over the regenerators 1 and 2, gases at a lower temperature and enriched in ethylene, but containing substantially no propylene, traverse conduit 8, the gas in bulb G of thermo-regulator T contracts so as to break the connection through terminals B and C and re-establishes the connection through terminals A and B thereby closing magnetic valve MVP and opening magnetic valve MVE.

The arrangement of the equipment and valves for carrying out the separation in accordance with Method Aa, is illustrated diagrammatically in Fig. 3. Such an arrangement of equipment involves the use of separators SE and SP, provided respectively for the condensation of ethylene-enriched and propylene-enriched fractions. By means of magnetic valves MVE and MVP under the control of thermo-regulator T, described hereinbefore, the ethylene-enriched fraction is directed through separator SE to drain pipe 11E during the initial revaporization stage. The propylene-enriched fraction is directed by means of magnetic valve MVP to separator SP and drain pipe 11P during the later revaporization stages.

If it is desired to obtain the propylene fraction in a more concentrated form than is possible with the foregoing methods, an arrangement (illustrated in Fig. 4) using three regenerators I, II and III may be adopted. In this arrangement a vacuum pump P is provided to revaporize the propylene condensed on the storage mass. The vacuum pump is connected on its suction side to the warm ends of the regenerators through a branched pipe 16 which is provided with valves Id, IId and IIId. The raw mixed gases are fed to the regenerators through pipe 6 as in Fig. 1 having three branches 6a, 6b and 6c in each of which is a valve respectively Ia, IIa and IIIa. When the gases have been substantially freed from the ethylene and propylene they are discharged through conduit 7 likewise having three branches, each of which is provided with a valve Ib, IIb, and IIIb respectively. The gases leave the cold ends of the regenerators through conduit 8 having three branches and pass to the separator in which the ethylene is separated in the first stage and the gases depleted in ethylene returned to the regenerators through conduit 9 which likewise has three branches I, II and III in each of which is a valve Ic, IIc and IIIc respectively. A valved draining pipe 11 serves for the withdrawal of the ethylene condensate from the separator. In a manner well known to those skilled in the art the four groups of valves a, b, c and d are coupled to a common automatic thermal control for sequential operation in successive periods as follows:

*First period*

When regenerator I is being used to cool the incoming gases whilst regenerator II is being cooled by cold effluent gases and regenerator III is subjected to the action of the vacuum pump P to withdraw propylene condensed on the storage mass, the following valves are open, Ia, IIc, IIb and IIIa while the remaining valves are closed.

*Second period*

When, as a result of the progressive rise in the temperature in storage mass in regenerator I, the ethylene has been revaporized and propylene is beginning to come off, the valves are switched over so as to connect regenerator I to the vacuum pump P whilst regenerator II, having been cooled down, is connected to inlet pipe 6 and regenerator III connected to conduit 9. For this purpose the following valves are open; IIa, IIIc, IIIb and Id, the other valves being shut.

*Third period*

When regenerator III is being used to cool the incoming gases, the following valves are open and the others shut: IIIa, Ic, Ib, IId.

In the next period the same valves are open as in the first period described hereinbefore, and the three periods complete one cycle. By this means a concentrated propylene fraction can be continuously withdrawn from the warm ends of the regenerators whilst the ethylene fraction is separately withdrawn from the cold ends.

The present process may be used for the separation of any mixtures of superheated vapors of higher and lower boiling points, soluble in each other, at any suitable temperatures and pressures below or above atmospheric. For instance, it may be employed for the separation of water-alcohol mixtures available in superheated state, oxygen-nitrogen mixtures, water-ammonia mixtures, with or without admixture of other constituents etc.

I claim:

1. A process for separating superheated vapors of mutually soluble constituents and groups of mutually soluble constituents of different boiling points which comprises passing a gaseous mixture containing superheated vapors of constituents having different boiling points and selected from the class consisting of mutually soluble constituents and groups of mutually soluble constituents into a precooled regenerator having a heat storage mass, controlling the temperature of the heat storage mass during said passage to condense practically all of the higher boiling point constituents together with a substantial amount of the lower boiling constituents at the initial stages of said passage, continuing to pass said gaseous mixture into said regenerator, thereby transferring heat from the gaseous mixture to the storage mass to raise the temperature thereof whereby a rectification effect is obtained, resulting in the progressive revaporization of the relatively lower boiling point condensed materials and replacement thereof by condensing constituents of relatively higher boiling point, removing said revaporized constituents of relatively lower boiling point from the regenerator and then in the succeeding period removing the condensed selectively retained constituents of higher boiling point from the regenerator.

2. A process for separating superheated vapors of mutually soluble constituents and groups of mutually soluble constituents of different boiling points which comprises passing a gaseous mixture containing superheated vapors of constituents having different boiling points and selected from the class consisting of mutually soluble constituents and groups of mutually soluble constituents into a precooled regenerator having a heat storage mass at a predetermined pressure, controlling the temperature of the heat storage mass during said passage to condense practically all of the higher boiling point constituents together with a substantial amount of the lower boiling constituents at the initial stages of said passage, continuing to pass said gaseous mixture into said regenerator, thereby transferring heat from the gaseous mixture to the storage mass to raise the temperature thereof whereby a rectification effect is obtained, resulting in the progressive revaporization of the relatively lower boiling point constituents and their replacement by condensing constituents of relatively higher boiling point, removing said revaporised constituents of lower boiling point from the regenerator, then in the succeeding period reducing the partial pressure of the condensed constituents of higher boiling point to a point lower than the partial pressure at which they passed into the regenerator and were condensed, thereby revaporising said higher boiling constituents and concurrently supplying part of the cold necessary for recooling the regenerator, and removing said revaporised constituents of higher boiling point from the regenerator.

3. A process for separating superheated vapors of mutually soluble constituents and groups of mutually soluble constituents of different boiling points which comprises passing a gaseous mixture containing superheated vapors of constituents having different boiling points and selected from the class consisting of mutually soluble constituents and groups of mutually soluble constituents into a precooled regenerator having a heat storage mass, controlling the temperature of the heat storage mass during said passage to condense practically all of the higher boiling point constituents together with a substantial amount of the lower boiling constituents at the initial stages of said passage, continuing to pass said gaseous mixture into said regenerator, thereby transferring heat from the gaseous mixture to the storage mass to raise the temperature thereof whereby a rectification effect is obtained, resulting in the progressive revaporization of the relatively lower boiling point constituents and their replacement by condensing constituents of relatively higher boiling point, removing said revaporised constituents of lower boiling point from the regenerator, collecting said lower boiling constituents, further continuing to pass said gaseous mixture into said regenerator, thereby transferring further amounts of heat to the storage mass to raise the temperature thereof, revaporising the condensed constituents of higher boiling point by said increase in temperature of the storage mass, and removing said revaporised constituents of higher boiling point from the regenerator.

4. A process for separating superheated vapors of mutually soluble constituents and groups of mutually soluble constituents of different boiling points which comprises passing a gaseous mixture containing superheated vapors of constituents having different boiling points and selected from the class consisting of mutually soluble constituents and groups of mutually soluble constituents in admixture with diluents of boiling point lower than at least some of the constituents of the aforesaid gaseous mixture into a precooled regenerator having a heat storage mass, controlling the temperature of the heat storage mass during said passage to condense practically all of the higher boiling point constituents together with a substantial amount of the lower boiling constituents at the initial stages of said passage and to leave the diluents of still lower boiling point in uncondensed form, continuing to pass said gaseous mixture into said regenerator, thereby transferring heat from the gaseous mixture to the storage mass to raise the temperature thereof whereby a rectification effect is obtained, revaporising the lower boiling constituents by said rectification effect, removing said revaporised constituents of lower boiling point from the regenerator, and then removing in the succeeding period the condensed selectively retained constituents of relatively higher boiling point from said regenerator.

5. The process set forth in claim 1 wherein the gaseous mixture is passed into the regenerator at the lower portion thereof and wherein the gaseous constituents removed from said regenerator emerge therefrom at the upper portion thereof whereby the gaseous mixture and gaseous constituents of said mixture are made to flow through the regenerator in an upward direction.

PAUL MAURICE SCHUFTAN.